May 1, 1928.
R. A. SCHMITT
SAFETY GROUNDING CONNECTION
Filed April 28, 1926
1,668,253
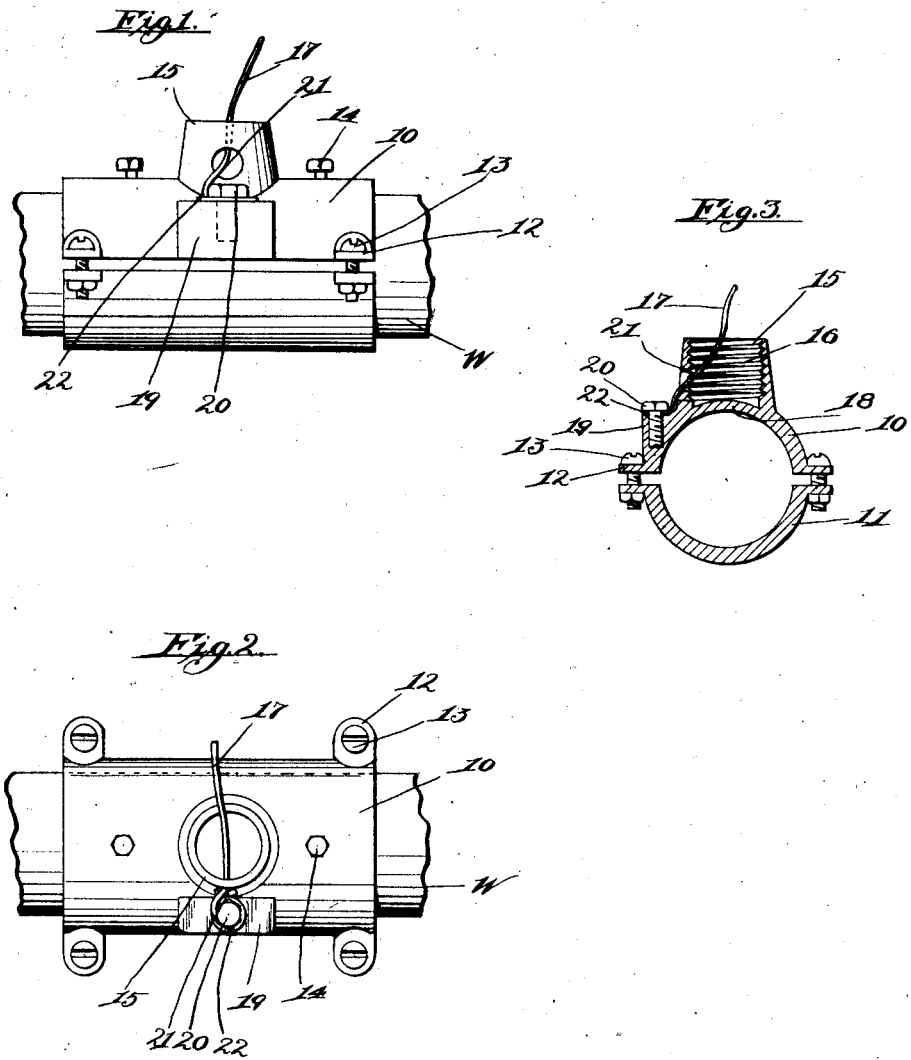
Inventor
Robert Andrew Schmitt
by Hazard and Miller
Attorneys Patented May 1, 1928.

1,668,253

UNITED STATES PATENT OFFICE.

ROBERT A. SCHMITT, OF SAN DIEGO, CALIFORNIA, ASSIGNOR OF ONE-HALF TO HENRY LIPPITT, OF SAN DIEGO, CALIFORNIA.

SAFETY GROUNDING CONNECTION.

Application filed April 28, 1926. Serial No. 105,166.

This invention relates to improvements in safety grounding connections, and is particularly an improvement over the construction disclosed in my pending application Serial No. 681,964, filed December 21, 1923.

An object of this invention is to provide an improved grounding connection or ground clamp wherein the neutral wire may be effectively and satisfactorily grounded upon a water pipe.

Another object of this invention is to provide an improved ground clamp of novel and simple construction.

With the foregoing and other objects in view which will be made manifest in the following detailed description and specifically pointed out in the appended claim, reference is had to the accompanying drawings for an illustrative embodiment of the invention, wherein:

Figure 1 is a side elevation of the improved grounding connection in applied position, Fig. 2 is a top plan view of the same, and Fig. 3 is a vertical section through the clamp.

Referring to the accompanying drawings wherein similar reference characters designate similar parts throughout, the improved safety grounding connection consists of two semi-cylindrical sections 10 and 11 having lugs 12 formed on their corners which are apertured and threaded to receive screws 13. These two sections are adapted to be applied about the water pipe W and fastened together by the screws. After they have been so fastened together, set screws 14 which are threaded into the top of the section 10 can be tightened to cause the grounding connection to be tightened about the water pipe. On the top of the section 10 there is a hollow stem 15 which may be interiorly threaded, as indicated at 16, to receive a pipe which protects the neutral wire 17 or permitting the device to be used in a manner similar to that disclosed in my pending application. The bottom of the stem may be blanked off, as indicated at 18, although such construction is optional. On the side of the upper section 10 at the base of the stem 15 there is provided a boss 19 having a recess therein which is threaded to receive a binding screw 20. On the same side of the stem 15 that the boss is located upon there is formed an aperture 21 through which the neutral wire 17 may extend to have its end clamped beneath the brass washer 22 which is immediately below the head of the binding screw 20.

From this construction it will be appreciated that a novel safety grounding connection is provided wherein the neutral wire can be satisfactorily grounded upon the water pipe.

It will be understood that various changes in the detail of construction may be made without departing from the spirit and scope of the invention as defined by the appended claim.

I claim:

A safety grounding connection comprising two semi-cylindrical sections, means for fastening said sections together about a water pipe, a hollow stem carried by one of said sections having an aperture formed through its side, there being a boss formed upon the mentioned section adjacent said aperture, and a binding screw mounted upon the boss whereby a wire in the stem may have its end extended through the aperture and secured to the boss by the binding screw.

In testimony whereof I have signed my name to this specification.

ROBERT A. SCHMITT.